United States Patent [19]

Rairdon et al.

[11] 3,987,229
[45] Oct. 19, 1976

[54] CALENDERED FILM/PLASTISOL FILM LAMINATE STRUCTURE

[75] Inventors: Charles T. Rairdon, Friedensburg; William E. Hanson, Orwigsburg, both of Pa.

[73] Assignee: Reneer Films Corporation, Auburn, Pa.

[22] Filed: Nov. 19, 1973

[21] Appl. No.: 416,820

[52] U.S. Cl. .............................. 428/148; 428/151; 428/201; 428/203; 428/208; 428/213; 428/215; 428/216; 428/328; 428/335; 428/463; 428/518; 428/520; 428/522

[51] Int. Cl.² .................... B32B 5/16; B32B 15/08; D06N 7/04

[58] Field of Search ........... 161/165, 256, 413, 218; 428/463, 522, 520, 518, 335, 201, 208, 212, 148, 203, 204, 328, 215, 216, 213, 151

[56] References Cited
UNITED STATES PATENTS

| | | | |
|---|---|---|---|
| 2,569,954 | 10/1951 | Ruebensaal | 161/218 |
| 2,617,750 | 11/1952 | Clair | 161/165 |
| 2,918,702 | 12/1959 | Wetterau | 161/160 |
| 2,956,915 | 10/1960 | Korn | 161/218 |
| 2,994,632 | 8/1961 | Brown | 161/218 |
| 3,049,459 | 8/1962 | Smith | 161/413 |
| 3,325,337 | 6/1967 | Harris | 161/5 |
| 3,336,180 | 8/1967 | Werner | 161/119 |
| 3,466,223 | 9/1969 | Beeler | 161/254 |
| 3,562,051 | 2/1971 | Strauss | 156/219 |
| 3,582,426 | 6/1971 | Meissner | 161/218 |
| 3,632,467 | 1/1972 | Todd | 161/256 |
| 3,773,545 | 11/1973 | Erb | 161/119 |

*Primary Examiner*—Marion E. McCamish
*Assistant Examiner*—Ellis P. Robinson
*Attorney, Agent, or Firm*—F. W. Brunner; J. A. Rozmajzl

[57] ABSTRACT

A decorative laminate material exhibiting stability to heat at temperatures used to bond such laminates to metal surfaces is prepared by bonding a calendered vinyl film to a vinyl plastisol.

3 Claims, 1 Drawing Figure

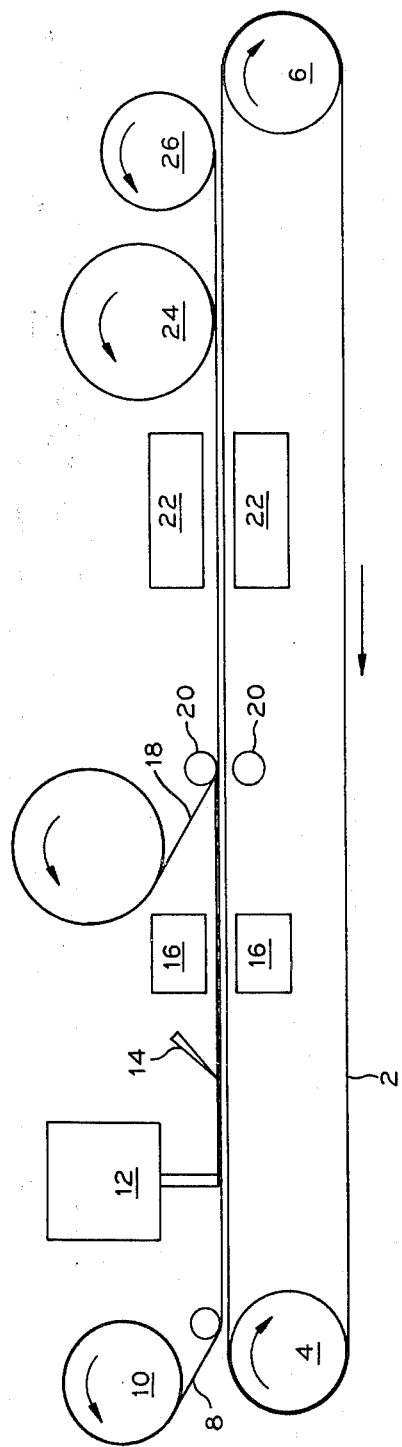

CALENDERED FILM/PLASTISOL FILM LAMINATE STRUCTURE

In one aspect this invention relates to decorative laminate materials. In another aspect it relates to a process for producing such laminates.

Decorative, flexible plastic materials are used in a variety of applications, such as wall coverings and surface decorations for metal, plywood, chipboard and the like. Such materials generally have good resistance to wear, abrasion, moisture and solvents. Many however are difficult to laminate to substrates at elevated temperatures. If oriented, as by biaxial stretching, they shrink when laminated at elevated temperatures. If embossed, they lose such embossing at elevated temperatures, due to the inherent "memory" of the plastic. Other materials, such as plastic cast plastisol films, deform at elevated temperatures. Composite materials often delaminate at elevated temperatures.

It is, therefore, an object of this invention to provide a flexible laminate material having a desired surface finish on one side and a heatstable polymeric film adhered to the opposite side, the composite being unified without the use of extraneous adhesives, the resultant laminate possessing a marked degree of resistance to separation of the materials which comprise it. It is another object to provide a heat-stable laminate material which retains its desired surface finish at elevated temperatures. It is a further object to provide a process for the production of such a heat-stable laminate material.

Other aspects and objects will be apparent to those skilled in the art from the disclosure, examples, appended claims and the accompanying drawing which is a diagrammatic view of the process for producing the heatstable, flexible materials of this invention.

In accordance with the present invention there is provided a process for producing a heat-stable, flexible composite material which comprises flowing a curable vinyl plastisol onto a casting release paper having a desired surface finish; partially curing the thus-cast plastisol by heating; overlaying a vinyl film onto the partially cured cast vinyl plastisol layer; lightly pressing the film onto the partially cured plastisol; heating the composite material to completely cure the plastisol and thereby adhere the film to the plastisol; removing the release paper from the cured composite; and thereafter recovering the laminate material as a product of the process.

Also, according to this invention, there is provided a laminate material consisting essentially of a vinyl plastisol wear layer and a vinyl film bonding layer, said film being maintained in adherent relation with said plastisol by a finite of or cured vinyl plastisol in the absence of an adhesive. In one aspect, the cured plastisol can be considered as an adhesive.

The laminate material can be applied to a variety of substrates, at elevated temperatures, without loss of surface definition, and without wrinkling.

The process of this invention will be more easily understood if explained in conjunction with the accompanying drawing. As shown in the drawing, an endless carrier belt 2 is driven around rolls 4 and 6. A thin layer of a release paper is laid down on carrier belt 2, from paper source 10. A mass of plastisol from plastisol supply 12 is formed into a uniform layer on the release paper to a thickness ranging from about 2 to about 25 mils. The thickness of the plastisol layer is controlled by doctor blade 14. This formed layer is carried by motion of this endless belt through radiant oven 16 wherein the plastisol is partially cured by heating for about 5 to about 30 seconds at a temperature ranging from about 200° to about 250° F. A plastic film 18 having a thickness of from about 2 to about 20 mils is laid down on the partially cured plastisol layer as the partially cured layer is carried from oven 16. The composite material is passed through pressure rolls 20 to effect contact between the film and the plastisol. The pressure used to effect contact is minimal; i.e., great enough to effect contact, but not so great as to squeeze out the plastisol layer. The composite is then passed through radiant oven 22 wherein the plastisol layer is completely cured and the film and the plastisol are completely bonded together. The composite is therein heated to a temperature ranging from about 250° to about 500° F. for a time ranging from about 1 to about 3 minutes. The composite, after emerging from oven 22 is cooled, by means not shown, for about 20 to about 60 seconds, then stripped from release paper 8 and taken up on product takeup roll 24. The release paper is taken up on roll 26.

The carrier belt can be in the form of an endless belt, as shown in the drawing, where a composite is formed in a continuous process. The carrier surface can also be in the form of a slab or other appropriate configuration if desired. Metal is the preferred material since a metal carrier is strong and durable, yet flexible. The carrier can also be formed of other materials such as plastic, rubber and the like. The carrier must be able to withstand temperatures of up to about 500° F. without deformation and should be flexible for a continuous process.

The release paper used for casting the plastisol is available commercially in a variety of textures and surfaces. The paper can be impregnated with a release fluid, or a release fluid or agent can be applied to the paper prior to casting the plastisol. Typical of release agents are silicones, waxes, heavy metal salts of high molecular weight fatty acids, such as aluminum stearate, zinc palmitate and the like.

Alternatively, the carrier belt and release paper can be combined in the form of an endless paper belt. Motion of the belt through the process can be constant or intermittent.

The wear layer, which is initially applied to the release paper, is formed from a plastisol. A plastisol is a uniform dispersion in a plasticizer of a thermoplastic resin in the form of fine particles. Small amounts of pigments and stabilizers can be present. A plastisol has appreciable fluidity at normal room temperature but is converted by heat into a flexible, solid thermoplastic mass. This ultimate result is brought about by the process of fusion wherein the resin becomes plasticized and solvated by the plasticizer. The plastisol composition is most conveniently applied as a liquid which is doctored or otherwise applied to the carrier in a controlled thickness film.

Polymers of vinyl chloride have been found to be particularly effective in formulating plastisol compositions for use in the invention. The vinyl chloride polymers can be either simple, unmixed homopolymers of vinyl chloride or copolymers thereof with up to about 40 weight per cent of other ethylenically unsaturated compounds copolymerized therewith. Suitable monomers include, for instance, vinyl esters on the order of vinyl bromide, vinyl choride, vinyl acetate, vinyl chloroacetate, vinyl butyrate, other fatty acid vinyl esters, vinyl alkyl sulfonates, and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinylnapthalenes, vinylpyridines, vinylpyrrole and the like; acrylic acid and its derivatives such as ethyl acrylate, methyl methacrylate, ethyl methacrylate, 2-chloroethyl acrylate; acrylonitrile, methacrylonitrile, dimethyl maleate, di-2-ethylhexyl fumarate, and the like; vinylidene compounds on the order of vinylidene chloride, vinylidene bromide, vinylidene fluorochloride and the like; olefins such as ethylene, propylene, isobutene and the like; allyl compounds such as allyl acetate, allyl chloride, allyl ethyl ether and the like; and conjugated and cross-conjugated ethylenically unsaturated compounds, such as butadiene, 2-methylbutadiene, 2-chlorobutadiene, 2,3-dimethylbutadiene 1,3-pentadiene and the like.

Resins adaptable for use in formulating vinyl chloride plastisols are commonly referred to as dispersion grade resins. Such resins are available having particle sizes of from 0.02 to about 2 microns in contrast to calender grade vinyl chloride resins which are available in particles ranging up to 35 microns in size. Dispersion grade resins are usually of higher molecular weight than calender grade resins and have particle surfaces of a hard, horny nature.

In the formulation of plastisol compositions for use in the invention the fine particle size resin is uniformly dispersed in liquid plasticizer. The fluidity of plastisols is influenced in part by the particular resin selected but is also a function of the ratio of plasticizer to resin. Plastisols become less fluid as the ratio of plasticizer is reduced. Plastisols for use in the invention contain from about 20 to about 100 parts plasticizer per 100 parts resin (phr). The fluidity of plastisols can also be controlled by the addition of small amounts of a volatile diluent not exceeding about 10 percent of the composition by weight.

The selection of the plasticizer is important in determining the strength and flexibility of the wearing surface of the product and also in influencing the viscosity and viscosity stability of the plastisol. Esters of straight and branched chain alcohols with aliphatic acids impart low viscosity and good viscosity stability to a plastisol. Typical plasticizers of this type include dibutyl sebacate, dioctyl sebacate, dioctyl adipate, didecyl adipate, dioctyl azelate, triethylene glycol di-(2-ethylhexanoate), and the like. Plasticizers of the aromatic type, such as esters of aliphatic alcohols and aromatic acids or aromatic alcohols and aliphatic acids or aromatic alcohols and aromatic acids, can be used although the use of highly aromatic plasticizers is limited by their tendency to yield plastisols of high viscosity. Typical plasticizers of this type include dibutyl phthalate, dicapryl phthalate, dioctyl phthalate, dibutoxyethyl phthalate, dipropylene glycol dibenzoate, butyl benzyl sebacate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffin, high molecular weight aromatic hydrocarbon condensates and the like, can also be used. The plasticizer or blend of plasticizers is chosen to yield a plastisol of the desired viscosity.

Minor amounts of stabilizers which are incorporated to reduce the effects of degradation by light and heat are present in the composition. Suitable light stabilizers include sodium capryl polyphosphate, octyl diphenyl phosphite, resorcinol dibenzoate, dibasic lead phosphites, benzotriazole and benzophenone derivatives and mixtures thereof and the like. Suitable heat stabilizers include barium, cadmium and zinc salts of fatty organic acids, organotin compounds such as dibutyl tin maleate, di-n-alkyl tin mercaptides and mixtures thereof and the like. Normally, the plastisol contains from 0.5 to 10 parts stabilizer per 100 parts resin. The particular stabilizers chosen should not impart viscosity instability to the plastisol composition.

Other additives which can be included in the composition include processing aids such as calcium stearate, cadmium stearate, stearic acid, synthetic waxes, polyethylene and the like, pigments and dyes and fillers such as calcium carbonate, clay, talc, fumed silica, metal powder or flakes (commonly known as "glitter"), titanium dioxide, cadmium sulfide, benzidine yellows, phthalocyanine blues and greens, cadmium-mercury based pigments, iron oxide, and the like.

The bonding layer is a film formed from the polymers discussed above. Such film is prepared by conventional methods using the polymers, plasticizers, stabilizers and other additives as hereinbefore discussed. Films for use in the invention contain from about 20 to about 35 parts plasticizer per 100 parts polymer. A major portion of the plasticizer is generally an aromatic type, such as di(2-ethylhexyl)phthalate, dibenzyl sebacate, and the like. In a preferred embodiment of this invention the film is a calendered film. Such films are prepared by conventional methods.

In one embodiment of this invention, release paper 24 has an embossed surface, and film 14 is printed with a decorative design. The resultant composite material provides a woodgrain effect when applied to a substrate.

In another embodiment, decorative metallic particles, generally known as glitter, are admixed with the plastisol. Film 24 is an opaque, colored film. The resultant composite exhibits the glitter against a solid colored background.

The following examples illustrate the present invention, which is not to be considered as limited thereby.

EXAMPLE I

The films and plastisols used in the Examples II-V were prepared from compositions having following recipes:

| Film Recipe | Pounds |
|---|---|
| PVC suspension resin | 248 |
| Di-(2-ethylhexyl)phthalate | 43 |
| Di-(2-ethylhexyl) adipate | 9 |
| Epoxidized soybean oil | 6 |
| Ferro 541A paste[1] | 3.06 |
| Heat stabilizer[2] | 5.30 |
| Color stabilizer[3] | 1 |
| Cadmium stearate | 0.67 |
| Calcium carbonate | 10 |
| Talc | 1.65 |

[1]50% paste of a sodium organophosphate light stabilizer in di-2-ethylhexylphthalate available commercially from Ferro Corp.
[2]A Ba/Cd/Zn heat stabilizer available as Mark 727B from Argus Chemical
[3]A phosphite chelating agent available as Mark C from Argus Chemical

| Plastisol Recipe | Pounds |
|---|---|
| PVC dispersion resin | 225 |
| PVC blending resin | 75 |
| Di-(2-ethylhexyl)phthalate | 24 |
| Plastolein 9066[1] | 81 |
| Viscosity modifier[2] | 25 |
| Epoxidized soybean oil | 6 |
| Heat stabilizer[3] | 6 |

| | |
|---|---|
| -continued | |
| Clay | 6 |

[1] A low-temperature plasticizer available commercially from Emery Industries.
[2] 3% fumed silica in trimethylpentanediol monoisobutyrate
[3] A Ba/Cd/Zn liquid heat stabilizer available commercially as Advastab BC-103A from Cincinnati Milacron

EXAMPLE II

A vinyl film was prepared from the recipe given in Example I, using a conventional calendering method. The film was given a woodgrain surface finish by embossing the surface of the film. The embossed film was bonded to a metal substrate using a high-temperature cure adhesive. At the temperature employed, approximately 300°–400° F., the surface of the film relaxed and the embossed woodgrain pattern was lost due to the inherent memory of the vinyl film.

EXAMPLE III

A portion of the plastisol prepared according to the recipe given in Example I was cast onto an embossed paper, then cured for about 2 minutes at about 350° F. After curing, the release paper was stripped from the cast plastisol. The cast plastisol was bonded to a metal substrate using a high-temperature cure adhesive. At the temperature employed, approximately 300°–400° F., the cast plastisol tended to lose its body and wrinkle excessively. Upon cooling, the wrinkles remained.

Examples II and III illustrate that neither a vinyl film nor a vinyl plastisol can, alone, be used in high-temperature applications.

EXAMPLE IV 4.5 phr of decorative metallic particles commonly referred to as glitter were admixed with a portion of the plastisol prepared in Example I. The plastisol mixture was applied to a smooth, glossy-surfaced release paper with the aid of a doctor blade to form a layer about 54 inches wide and 12 mils thick. The thus-coated release paper was passed through a radiant oven at a constant speed to give a residence time in the oven of about 15 seconds. The plastisol layer was partially cured at a temperature of about 225° F. and emerged from the oven with a tacky surface.

2.5 phr (parts per 100 parts resin) of titanium dioxide was admixed with the film formulation of Example I. A calendered film having a thickness of 3 mils, was formed from this admixture. The thus formed film was applied to the tacky surfaces of the plastisol layer as it emerged from the radiant oven. The composite was passed through pressure rolls to closely position the plastisol layer and the film together. The plied material was then passed through a second radiant oven wherein it was heated to a temperature of about 350° F. to 400° F. The residence time in the second oven was approximately 2 minutes. The emerging laminate was cooled one minute and wound up on a takeup roll as it was stripped from the carrier belt. The laminate was characterized as being wrinkle-free, firmly bonded together, and having the appearance on the side to be exposed (the release belt side) of numerous yellow metal particles distributed in a random pattern against a white background. The surface was smooth and glossy.

EXAMPLE V

A calendered film was prepared by admixing 4 phr of iron oxide with the film recipe of Example I to pigment the film brown. The brownpigmented film was overprinted with a woodgrain finish simulating walnut by a conventional process.

The clear plastisol was laid down on a release belt textured to simulate woodgrain with the aid of a doctor blade to form a layer about 54 inches wide and 10 mils thick. As before, the plastisol was partially cured at about 225° F. as it passed through the first oven in about 15 seconds. The emerging plastisol with a tacky surface was immediately contacted with the calendered film with the woodgrain finish side down. The composite was passed through pressure rolls as before to form a smooth, partially bonded laminate. The plied material was passed through a second oven wherein the plastisol was completely cured and final bonding of the layers was achieved. The residence time in the second oven was about 2 minutes at a temperature of about 350° F. to 400° F. The emerging laminate was cooled for approximately 1 minute and wound on a takeup roll as it was stripped from the carrier belt. The laminate was characterized as being wrinkle-free, firmly bonded together and having the appearance on the side to be exposed (the release belt side) of walnut. The surface was dull and had a woodgrain effect. The resulting woodgrain finish did not lose its definition during the high-temperature bonding to a metal substrate.

Variations and modifications are possible within the foregoing discussion and disclosure, without departing from the spirit or scope thereof.

We claim:

1. A laminate structure consisting of
   a metal substrate,
   a heat-stable, decorative composite consisting essentially of a wear layer in adherent relation to a bonding layer, said wear layer being a cast vinyl resin plastisol comprising a vinyl resin and a plasticizer, said plasticizer being present in an amount ranging from about 20 to about 100 parts per 100 parts vinyl resin, said wear layer having a thickness ranging from about 2 to about 25 mils; said bonding layer being a vinyl film comprising a vinyl resin and a plasticizer, said plasticizer being present in an amount ranging from about 20 to about 35 parts per 100 parts vinyl resin, said bonding layer having a thickness ranging from about 2 to about 20 mils, and
   a high temperature cure adhesive having a cure temperature in the range of 300°–400° F intermediate said metal substrate and said bonding layer of said decorative composite.

2. The laminate structure of claim 1 wherein said wear layer is clear and has cast on the outer surface thereof a texture and said bonding layer is opaque and has printed on the surface adjacent said wear layer a decorative pattern.

3. The laminate structure of claim 1 wherein wear layer is clear and has admixed therein decorative metallic glitter particles, and said bonding layer is opaque.

* * * * *